May 21, 1968  G. L. BROWN ET AL  3,384,868
MARINE VIBRATOR DEVICE

Filed Jan. 5, 1967 2 Sheets-Sheet 1

INVENTORS
GRAYDON L. BROWN &
DELBERT W. FAIR
BY
William J. Miller
ATTORNEY

United States Patent Office 3,384,868
Patented May 21, 1968

3,384,868
MARINE VIBRATOR DEVICE
Graydon L. Brown and Delbert W. Fair, Ponca City, Okla., assignors to Continental Oil Co., a corporation of Delaware
Filed Jan. 5, 1967, Ser. No. 607,551
11 Claims. (Cl. 340—8)

ABSTRACT OF THE DISCLOSURE

An apparatus for the generation of seismic energy waves within a water medium which consists of a rigid frame member and suspension attachments, the frame member movably securing a piston plate between upper and lower sealed bellows which are alternately pressurized by reciprocal oil flow to vibrate the piston plate relative to the frame member; the apparatus also including the employ of an additional bellows which is sealed between the piston plate and frame member to receive varying air pressure to thereby maintain static pressure balance.

BACKGROUND OF THE INVENTION (1) Field of the invention.—The invention relates generally to seismic energy vibrators and, more particularly, but not by way of limitation, it relates to improved vibration apparatus for use as a seismic energy source within a water medium.

(2) Description of the prior art.—The prior art includes several types of mechanical vibrators which provide acoustic energy output of reasonably high value in a water medium. Prior vibrators have shown notable disadvantages, for example, certain design considerations as to sealing membranes and other flexible components have proven to be trouble points, the required materials being subject to fatigue breakage necessitating expensive periods of equipment down time for repair, replacement, etc. In addition, the prior types have been found to generate non-linearities of wave output due to certain inherent construction problems.

SUMMARY OF THE INVENTION

The present invention contemplates a marine vibrator wherein a reciprocating piston is hydraulically driven by a pair of opposed bellows coaxially and sealingly connected on opposite sides of the piston. In a more limited aspect, the invention consists of a frame assembly having upper and lower plate members and having a piston plate suspended therebetween by a pair of upper and lower coaxial bellows, each bellows being sealingly connected between the respective upper or lower plate member and the respective side of the piston plate. Reciprocal application of hydraulic pressure, as controlled from the surface station, to each of the upper and lower bellows will drive the piston plate relative to the frame assembly to thereby generate seismic or acoustic energy within the water medium. A further refinement consisting of a third larger bellows sealingly connected between the lower frame or base and the piston plate is included for purposes of equalization of static pressure by varying the air pressure therein. An alternative form of the invention takes advantage of the desirable attributes of the bellows by employing a single bellows connection between the reaction mass and main frame while utilizing a tried and proven type of linear hydraulic actuator as is used in kindred types of seismic vibrator.

Therefore, it is an object of the present invention to provide a marine vibrator which is much improved as to the average duration of trouble free field service.

It is also an object of the invention to provide an apparatus for use as a seismic energy source within a body of water which is of relatively simple construction utilizing components and mechanical principles which lessen the probability of equipment failure due to materials fatigue.

Finally, it is an object of the present invention to provide a seismic vibrator of a construction which enables greater efficiency of output for a given striking or effective piston area.

Other objects and advantages of the invention will be evident from the following detailed description when read in conjunction with the accompanying drawings which illustrate the invention.

DESCRIPTION OF THE PREFERRED EMBODIMENT

Figure 1:
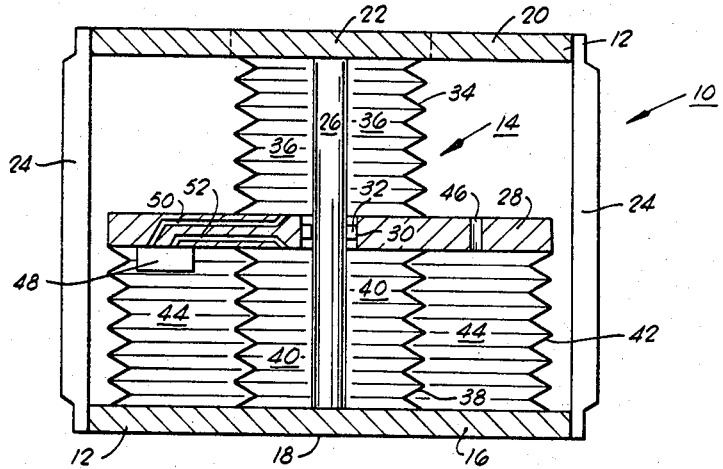
FIG. 1 is a schematic representation of a general form of the vibrating apparatus in vertical section.

The schematically illustrated vibrator 10 of FIG. 1 can be seen to consist of an outer frame 12 which encloses and supports a piston and bellows assembly 14 for reciprocal movement therein. The outer frame 12 consists of a lower plate member 16 which presents a smooth, continuous striking face 18 and an upper frame or plate member 20 which is solid at least at the inner or central portion 22 thereof. A plurality of side frame supports 24 may then be welded or otherwise suitably fastened between the upper plate member 20 and lower plate member 16. The side supports 24 being of sufficient number and symmetrical placement about the vibrator 10 to lend the necessary structural support.

The piston and bellows assembly 14 is centered about a shaft 26 which is vertically centrally aligned and rigidly secured between the inner surfaces of upper plate member 20 and lower plate member 16. A piston 28 having a central, axial opening 30 is positioned around the shaft 26. A conventional form of slidable seal shown generally as a ring 32 provides a fluid-tight seal between shaft 26 and piston 28.

A first upper bellows 34 defines an upper cylinder or expansible chamber 36 as it is sealingly connected about the upper portion of shaft 26 between the solid central portion 22 of upper plate member 20 and the upper surface of piston 28. Similarly, a lower bellows 38 is arranged in axial alignment to define a lower cylinder or expansible chamber 40 as it is sealingly connected between the lower face of piston 28 and an inner circumferal area of lower plate member 16. The bellows 34 and 38 are preferably of similar construction, that being of metal such as stainless steel with the convolutional configurations being one of the conventional designs. Sealing connection about the ends of the bellows can be effected in various ways as well be further described below.

Still a third bellows 42 is sealingly connected concentrically around bellows 38 between the opposing faces of piston 28 and lower plate member 16. The larger bellows 42 defines a third cylinder or expansible chamber 44 which is maintained as an air chamber for balancing static pressure by regulation of the interior air pressure by means of the hole 46 through piston 28 (as will be described).

A servovalve 48 may be mounted beneath the piston 28 within the air space 44, thus locating the servovalve out of contact with either water or oil. The servovalve 48 receives hydraulic pressure variations from a plurality of hydraulic lines (not shown) from a remote control station to connect the hydraulic fluid alternately through channeled ports 50 and 52 into the respective upper and lower cylinders 36 and 40. The servovalve 48 may be a well-known type of four-way valve which rapidly reverses the application of fluid as between the hydraulic ports 50 and 52. Such hydraulic vibrator drive mechanisms are the particular subject matter of U.S. Patent No. 3,159,233 entitled "Seismic Transducer Construction" in the name of F. Clynch et al., and the U.S. patent application Serial Number 457,285, filed May 20, 1965, now Patent No. 3,329,930, in the name of Jimmy R. Cole et al. and entitled "Marine Vibration Transducer," the foregoing patent and application each being assigned to the present assignee.

In operation, the vibrator 10 can be placed in a selected body of water or shooting site at a predetermined depth and then, by means of the vent hole 46, the air pressure within air chamber 44 can be balanced to equal the pressure exterior to the piston and bellows assembly 14. This balancing of static pressure of the vibrator 10 tends to insure most efficient coupling of vibratory energy into the surrounding water body. Thereafter, as controlled from remote support equipment, hydraulic pressure is alternately applied between the ports 50 and 52, such that alternating increases and decreases of hydraulic pressure are applied within the upper and lower cylinders 36 and 40 complementarily. That is, for example, as increasing hydraulic pressure is evident through port 50 to upper chamber 36, the upper bellows 34 expands, and, at the same time, lower bellows 38 contracts a like amount as reduced hydraulic pressure is felt through port 52 and the lower chamber 40. The net effect is a downward movement of piston 28 with sliding seal 32 providing oil-tight coupling between the inner wall of piston hole 30 and the shaft 26.

As hydraulic pressure is alternated by means of the servovalve 48, exterior control, etc., the piston 28 moves reciprocally relative to the upper plate member 20 and the lower plate member 16. Upper and lower frame plates 20 and 16 actually serve as a reaction mass in the vibrator system and the lower face 18 of frame plate 16 actually serves to impart the acoustic energy into the water medium. Thus, an upward stroke of piston 28 results in a compressional acoustic wave as created in the water beneath vibrator 10 and, thereafter, the downward stroke of piston 28, tending to withdraw lower plate face 18, will cause a dilational wave in the body of water. The frequency and number of compressional and dilational waves is a matter of choice and may be set into the system by appropriate regulation of the hydraulic control assembly (not shown).

Figure 2:
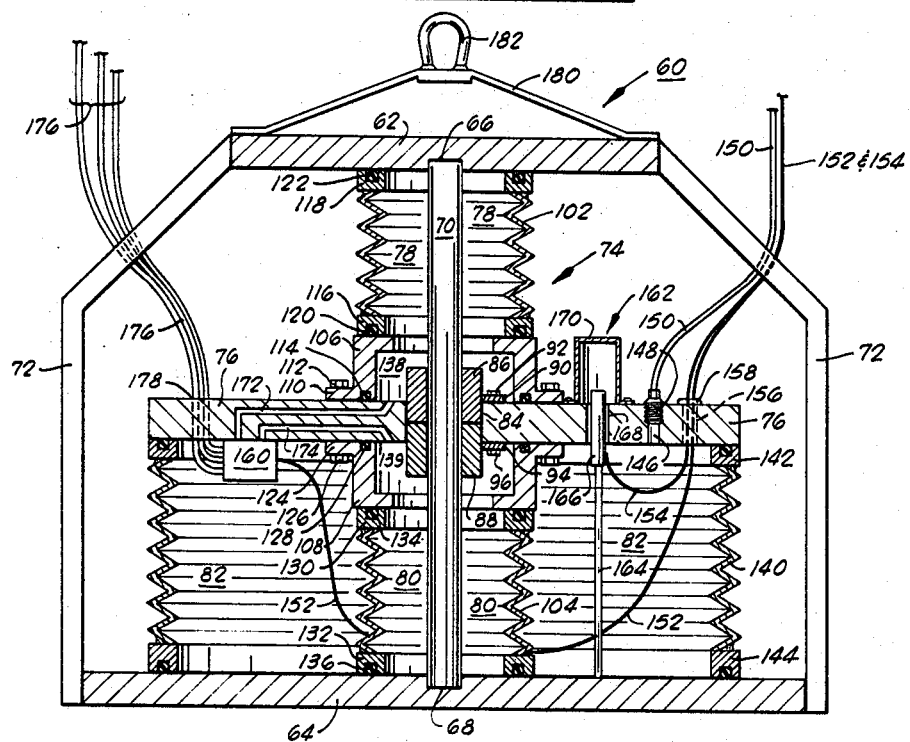
FIG. 2 is a vertical cross-section of a representative form of the vibrator apparatus which embodies particular design considerations.

A more detailed illustration of a vibrator 60 constructed in accordance with the invention is shown in FIG. 2. The vibrator 60 consists of an upper plate 62 and a lower plate 64 having opposed central holes 66 and 68 for receiving opposite ends of a shaft 70. The upper and lower frame plates 62 and 64 are maintained in rigid connection securing shaft 70 by means of a plurality of side supports 72 which may be welded or otherwise secured in upright supporting manner between the upper and lower frame plates 62 and 64. For example, the upper and lower frame plates 62 and 64 may be cylindrical or of other symmetrical shape and a preset plurality of side supports 72 would then be positioned therearound at equal intervals.

A piston and bellows assembly 74 is supported upon the shaft 70 between the upper and lower frame plates 62 and 64. A piston 76 slidingly placed around shaft 70 in sealed or oil-tight relationship is connected to both an upper cylinder or chamber 78 and a lower cylinder or chamber 80. Also, a larger, static pressure balancing chamber 82 is disposed about the under side of piston 76 and surrounding the lower chamber 80.

The piston 76 is disposed to surround the shaft 70 by means of the axial hole or opening 84 which has a pair of cylindrical block bushings 86 and 88 positioned therein.

The upper bushing 86 is formed to have a suitable plurality of ear tabs 90 which can be secured to piston 76 by means of fasteners or bolts 92; similarly, the lower bushing 88 is secured by means of a selected plurality of ear tabs 94 and bolts 96. The cylindrical bushings 86 and 88 may be any of the conventional box-type bushings, e.g., cylindrical bushings formed of graphite impregnated bronze, such bushings providing slidable but oil-tight contact with the shaft 70.

The upper and lower expansible chambers 78 and 80 are formed by a pair of bellows 102 and 104, respectively, which are sealingly secured about the respective upper and lower collar members 106 and 108. The upper collar 106 is secured to the upper side of piston 76 by means of a plurality of ear tabs 110 and bolts 112 which secure an oil-water seal, O-ring 114, therebetween. The upper bellows 102 has a pair of mounting rings 116 and 118 welded or otherwise affixed to the opposite ends thereof and these rings are suitably screwed, welded or otherwise fastened to the upper collar 106 and underside of upper frame plate 62. As shown in FIG. 2, an oil-water seal may be provided by the groove/O-ring combinations 120 and 122 while the respective mounting rings 116 and 118 are fastened in a selected known manner. For example, preformed ear tabs and cap screw fasteners (not shown) may be employed.

Lower expansion chamber 80 is formed in a similar manner by bellows 104. That is, the lower collar member 108 is secured about the underside of piston 76 by means of a plurality of ear tabs 124 and cap screws or such 126, a groove/O-ring air-oil seal 128 being included therebetween. The lower bellows 104 has a pair of mounting rings 130 and 132 affixed to the respective upper and lower ends, and these mounting rings 130 and 132 are suitably connected and sealed (air-oil) as by the grooves/O-ring combinations 134 and 136 maintained against the lower collar 108 and an inner annular portion of the lower frame plate 64, respectively. Thus, each of the upper and lower collars 106 and 108 form fluid passage chambers 138 and 139 which communicate with the respective upper chamber 78 and lower chamber 80 to allow hydraulic fluid flow reciprocally thereto as will be further described.

The outer or air chamber 82 is formed by means of a bellows 140 which is of similar type but larger circumference than the bellows 102 and 104. Bellows 140 has a similar pair of mounting rings 142 and 144 mounted at opposite ends thereof and these mounting rings are fastened in sealing (air-water) relationship to the underside of piston 76 and the lower frame plate 64, respectively. Once again, although not specifically shown, conventional types of sealing and fastening practice may be employed.

The bellows 102, 104 and 140 are preferably of very sturdy construction; for example, they may be formed for stainless steel with their respective end mounting rings welded thereto. Such heavy, metallic bellows assemblies are commercially available from various sources, e.g. Sealol, Inc., of Providence, R.I.

In addition to providing static pressure balance, the bellows 140 and air chamber 82 also provide a fluid free space wherein various electrical assemblies and other appendant units may be mounted. The air pressure is controlled via a hole 146 through piston 76 which is fitted with a connector 148 and an air line 150 which then leads up to the surface or other such support vehicle and the selected pressure control equipment (not shown).

Also, a pair of electrical conductors 152 and 154 are led through an additional hole 156 in piston 76, which is sealed air-tight to a suitable packing 158, to be led up to the surface control equipment. The control conductor 152 carries electrical information for controlling a servovalve 160, while the electrical cable 154 conducts A-C energizing voltage and sensed control voltage indications for connection to the linearly variable differential transformer 162 (hereafter designated LVDT).

The LVDT 162 consists of a supporting rod 164 which maintains an electromagnetic transformer assembly 166 in a predetermined position within a hole 168 through piston 76 such that flux variations can be sensed to derive a control signal proportional to vibrator movement. A can or cover 170 serves to protect the LVDT 162 while maintaining a water-tight seal thereabout. The use and structure of LVDT assemblies as used with hydraulic vibrators is well-known in the art and is more particularly the subject matter of the aforementioned patent application, Serial Number 457,285, entitled "Marine Vibration Tranducer."

The servovalve 160, a conventional type of four-way valve, is also affixed beneath the piston 76 in suitable manner in communication with a pair of ports 172 and 174 which are channeled within the piston 76. The port 172 is channeled to open upwardly within the chamber 138 leading to the upper expansion chamber 78 while the remaining port 174 is channeled downwardly through chamber 139 to the lower expansion chamber 80. Hydraulic power is supplied via a plurality of hydraulic lines 176 which are suitably passed through piston 76 at point 178, conventional packing being employed, to provide hydraulic power to the servovalve 160. The plurality of hydraulic lines 176 are also led upward to the support vehicle and the appurtenant hydraulic control system (not shown).

A support member 180 is welded or fastened across the upper frame plate 62 and a hanger eye 182 is suitably affixed thereto in a balanced position. Also, while not specifically shown, it may be advisable to provide a plurality of clamps about the upper supports 72, frame 180 or the supporting cable (not shown) for maintaining all of the control lines 150, 152, 154 and 176 in proper operating position to avoid snagging, tearing or whatever.

OPERATION ON FIG. 2 EMBODIMENT

The vibrator 60 may be operated from a suitable support vehicle or craft which will have the necessary auxiliary equipment, i.e., hydraulic system, air regulator, electronics, etc. The supporting line for affixture to the hanger eye 182 would preferably include a large isolation spring (not shown), for the purpose of damping vibrations which would otherwise cause reactions back up the supporting cable. The employment of such heavy compression spring or other isolation device insure an increased coupling of acoustic energy into the water body.

When the vibrator 60 is immersed into a water body to its preselected depth, the onboard air control equipment is operated so that the static air pressure within the air chamber 82 is made equal to the water pressure therearound. This is effected by air pressure control through the hose 150, connector 148 and hole 146. When the static pressure has been set, the vibrator 60 is in condition for operational use and can then be operated through a desired duration of vibration, i.e., any of a number of frequencies occurring in upsweeps, downsweeps, etc. As is well known, it is usually desirable to generate an output seismic signal which is an upsweep or downsweep of frequencies between about five and eighty or ninety cycles per second. The conditions of water bottom and sub-terrain will probably enter into the selection of vibration frequencies and the duration of such.

Actuation of the vibrator 60 is effected through the hydraulic lines 176 and servo valve 160 to alternately apply and withdraw hydraulic fluid flow through the ports 172 and 174 which lead to the respective upper and lower expansion chambers 78 and 80. As previously described, the pressure application to chambers 78 and 80 works complementrily such that one is expanded while the other is proportionately contacted. The pressure provided from the source is controlled by servovalve 160 to alternate this effect as between the upper and lower chambers 78 and 80.

The frame member, i.e., upper and lower frame plates 62 and 64 and the various side supports 72, actually serve as the reaction mass which moves the adjacent water in particulate action in response to the movement of piston 76. Thus, when hydraulic fluid pressure is applied from servovalve 160 and lower port 174 to expand the lower chamber 80, it develops a force which drives the piston 76 upward and lower frame plate 64 downward such that the exposed bottom side of lower frame plate 64, in contact with the water body, develops a compressional wave in the water body. Alternately, a reversal of the applied pressure to reverse the stroke of piston 76 tends to cause a reaction of the lower frame plate 64 upward to develop a dilational wave in the water medium. The very rapid and continuous stroke of piston 76 will then develop alternating particle action in the water which radiates as acoustic energy through the water medium and into the sub-terrain to be sensed later after deep reflection or refraction as seismic energy return.

FIG. 3 EMBODIMENT

Figure 3:
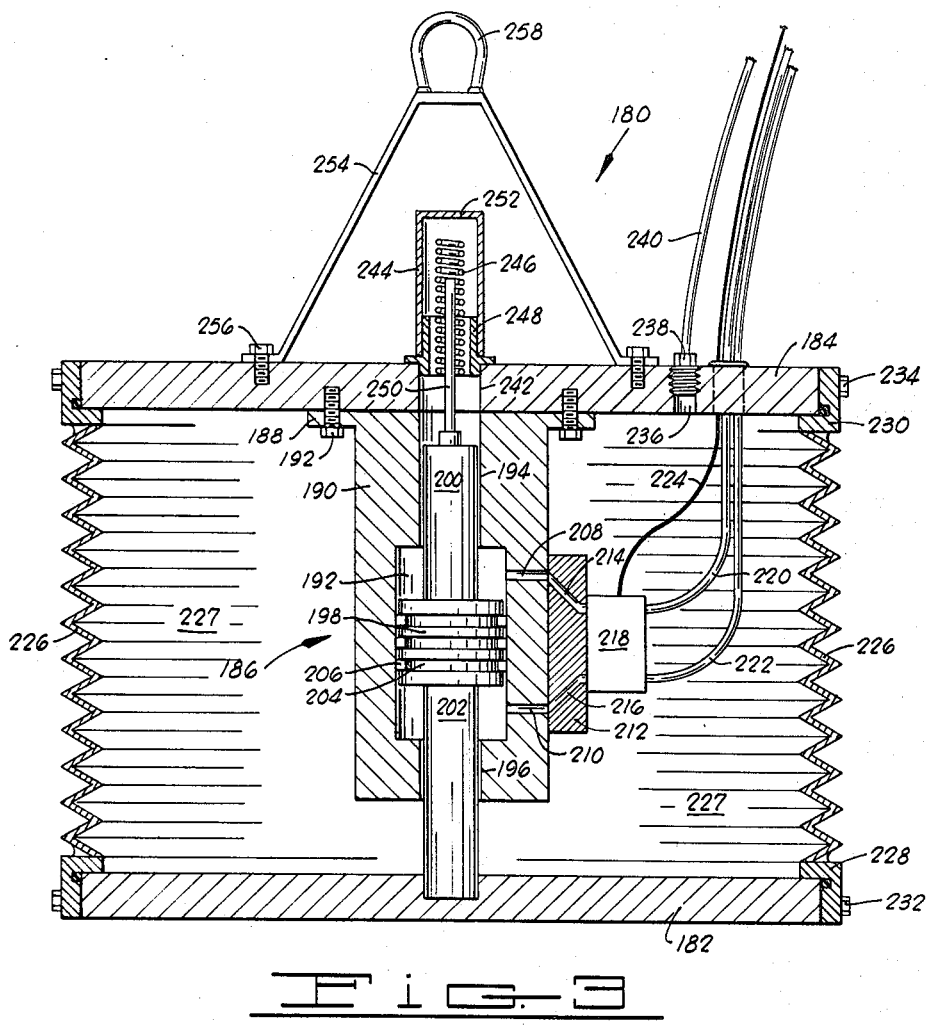
FIG. 3 is a vertical cross-section of an alternative form of marine vibrator apparatus using a single bellows.

Another form of marine vibrator apparatus 180 may be constructed as shown in FIG. 3. The marine vibrator 180 is comprised of a piston or lower member 182 which is vibrated relative to an upper plate member 184 by means of a hydraulic liner actuator or reciprocating ram assembly 186. The marine vibrator 180 utilizes only a single bellows 188 to fulfill the various static pressure equalizing and sealing functions as will be further described below. A similar type of piston assembly as driven by a hydraulic linear actuator is the particular subject matter of U.S. patent application Ser. No. 592,155 entitled, "Marine Vibration Transducer" which was filed on Nov. 4, 1966, in the name of Cole et al. and assigned to the present assignee.

More particularly, the hydraulic linear actuator 186 is securely mounted or fastened to the under side of upper plate member 184 by means of a suitable mounting collar 188 which may be formed integrally with hydraulic cylinder 190. A plurality of cap screws 192 may serve to fasten the collar portion 188 to the upper plate member 184. The hydraulic cylinder 190 defines a central hydraulic chamber 192 having axial end bores 194 and 196 such that a hydraulic piston 198 having respective upper and lower rod ends 200 and 202 may be disposed therein for reciprocal movement. The hydraulic piston 198 may be formed with a plurality of circumferential grooves 204, each groove retaining a suitable form of commercially available piston ring 206. The upper rod end 200 is allowed to reciprocate within the hydraulic cylinder end bore 194 while the lower rod end 202 extends through the cylinder bore 196 into rigidly fastened connection with the lower plate 182.

Hydraulic cylinder 190 is formed with a pair of fluid ports 208 and 210 which communicate with respective upper and lower spaces of hydraulic chamber 192. A manifold casting 212 can then be secured to the outer surface of hydraulic cylinder 190 to place respective port passages 214 and 216 in communication with cylinder ports 208 and 210. The manifold ports 214 and 216 then communicate with fluid passages (not shown) within servovalve 218 which controls fluid application from a hydraulic source (not shown) which is connected via hydraulic lines 220 and 222. An electrical control cable 224 is also shown as being connected to the servovalve 218. The particular type of servovalve, a conventional four-way hydraulic control valve, as well as the hydraulic fluid routing and electrical control of such is more particular subject matter in the aforementioned U.S. patent applications.

A bellows 226 is fastened securely in sealing (water-air) relationship between the outer circumferal edges of the lower and upper plate members 182 and 184 respectively to define a chamber 227. The bellows member 226 may also be of the sturdy, stainless steel variety which is welded to respective lower and upper right angle mounting rings 228 and 230 which may be secured to lower and upper plate members 182 and 184 by means of respective pluralities of cap screws 232 and 234. Here again, conventional sealing practice utilizing O-rings or such may be utilized. An air passage 236 is placed through the upper plate member 184 and a suitable screw connector 238 and flexible air line 240 provide connection to a suitable air control apparatus which may be located at the surface craft or vehicle. Thus, control of air pressure via air line 240 enables adjustment of the static air pressure within the vibrator 180, i.e., the chamber 227.

The upper plate member 184 is formed with a central bore 242 placed to allow the addition of a selected type of linearly variable differential transformer, LVDT 244. The LVDT 244 consists of a specially wound coil 246 which is suitably mounted as by a collar member 248 to be centrally suspended over the bore 242. A rod and core 250 secured to the upper end of rod end 200 will reciprocate a length of permeable material within coil 246 during hydraulic actuation to yield a flux variation which can be sensed or picked up electrically for conduction to the surface control area as a control signal. The can 252 provides a waterproof covering over the coil 246 and rod-core 250 assembly. Such LVDT assemblies are commercially available from the Sanborn Company of Waltham, Mass., and the use of such LVDT assemblies in hydraulic vibrator applications is more particularly covered in each of the aforementioned patent applications.

A suitable hanger strap 254 may be welded or otherwise fastened as by bolts 256 to the upper surface of upper plate member 184. An eye-bolt of such connector 258 can then be affixed thereon to provide a suspension point for supporting the vibrator 180.

In the operation of marine vibrator 180 the apparatus is suspended, preferably by an isolation spring, into a water body wherein it is desired to generate seismic energy. As was the case in the previous embodiments, the vibrator apparatus 180 is lowered into the water whereupon static pressure is balanced through the air control line 240 which communicates with the interior chamber 227. With application of a proper control signal, hydraulic ram assembly 186 can be made to reciprocate to move the lower plate member 182 relative to the upper plate member 184 to thereby generate an acoustic or seismic energy output in the water body.

That is, as hydraulic energy is applied to move hydraulic piston 198 upward and lower plate member 182 is moved upward dilational particulate motion is imparted to the water medium below the striking face or lower plate member 182. Then, as the direction of hydraulic piston 198 is reversed and its downward movement forces the lower plate member 182 downward, compressional particulate action takes place to generate the alternate acoustic action, compressional wave energy. Thus, the vibrator 180 generates acoustic energy which travels outward and downward through the water body in well-known manner to be later detected as refracted or reflected seismic energy.

The single bellows alternative of FIG. 3 actually has the ability to give good power output of acoustic energy while still maintaining at a minimum the potential breaking points or places where a high probability of fatigue breakdown is likely. The nature of bellows 226 is to allow vertical movement while resisting lateral movement to a great degree and this attribute coupled with its inherent resistance to fatigue breakage enables the construction of the highly efficient acoustic energy transducer.

The foregoing discloses a novel marine vibrator of a type which enables greater output efficiency while lessening the probability of mechanical failure. The vibrator employing expansible piston chambers can be completely sealed such that all of the essential components are maintained free from corrosion. It should be understood that the specification of materials set forth herein is merely by way of example and that very many metals, alloys, etc. may be employed in constructing the marine vibrational transducer; it should also be understood that the physical dimensions and overall design of the vibrator may be varied within wide limits and that while generally cylindrical construction has been alluded to it is only necessary that the construction design be of sufficient symmetry to provide balance and evenly distributed structural strength. Still further, it must be stated that a rudimentary but effective form of bellows driven vibrator may be constructed without including static pressure features, i.e., the third or outer air bellows as found in FIGS. 1 and 2.

It is also contemplated that some applications may benefit from particular contour shaping of the striking face of the lower plate member of the vibrator, thereby eliminating or lessening cavitation effects. It should be noted too that the various fastener elements employed in the invention may be conventional types, accepted rules of selection governing.

Changes may be made in the combination and arrangement of elements as heretofore set forth in the specification and shown in the drawings; it being understood, that changes may be made in the embodiments disclosed without departing from the spirit and scope of the invention as defined in the following claims.

What is claimed is:
1. A seismic energy vibrator, comprising:
shaft means;
upper and lower plate means rigidly secured to the opposite ends of the shaft means;
piston means disposed about said shaft means in slidable, oil-tight sealed relationship;
upper and lower bellows disposed around the opposite ends of said shaft means and being sealingly connected between the opposite sides of said piston means and the respective upper and lower plate means; and
means for alternately applying fluid pressure within the upper and lower bellows such that said piston means is reciprocated in response thereto.

2. A vibrator as set forth in claim 1 which is further characterized to include:
additional bellows means sealingly connected between said piston means and said lower plate means and concentrically surrounding said lower bellows means to define an annular chamber; and
means including a vent through said piston means for adjusting the air pressure within said additional bellows means.

3. A vibrator as set forth in claim 1 which is further characterized to include:
a plurality of side support members disposed about and rigidly affixed between said upper and lower plate means to form a vibrator frame assembly.

4. A vibrator as set forth in claim 2 wherein said means for applying alternating fluid pressure comprises:
first and second port means channeled through said piston means, said first and second port means leading between the respective upper and lower bellows interiors to a point on the underside of said piston means within said annular chamber; and
servovalve means mounted on the underside of said piston means at said underside point to control the fluid pressure application through said ports such that it is alternating between said upper and lower bellows; and
fluid pressure supply means providing an input to said servovalve means.

5. A vibrator as set forth in claim 1 wherein said upper and lower bellows each comprise:
a metallic bellows;
a mounting ring rigidly secured around each end of said bellows, said mounting rings including means to provide sealing joinder to adjacent surfaces of like configuration.

6. A vibrator as set forth in claim 5 wherein said bellows are constructed from stainless steel.

7. A vibrator for imparting seismic energy vibrations into a body of water comprising:
frame means including uper and lower rigidly secured plate members;
shaft means which is rigidly connected between said upper and lower plate members;
piston plate means disposed slidably about said shaft means in oil-tight sealed relationship, and piston plate means being generally parallel to said upper and plate members;
first bellows means connected in sealed relationship between said upper plate member and said piston plate means and concentric to said shaft means;
second bellows means connected in sealed relationship between said lower plate member and said piston plate means and concentric to said shaft means; and
control means for alternately varying the oil pressure within said first and second bellows means such that said piston plate means is made to vibrate relative to said frame means.

8. A vibrator for imparting seismic energy vibrations into a body of water as set forth in claim 7 which is further characterized to include:
third bellows means disposed in sealed relationship between said lower plate member and said piston plate means and concentrically around said second bellows means to form a static balance air chamber therebetween.

9. A vibrator for imparting seismic energy vibrations into a body of water as set forth in claim 7 wherein each of said bellows means comprises:
a metallic bellows member;
a pair of mounting rings rigidly secured around each end of said bellows; and
means including sealing rings for affixing said mounting rings in sealed, abutting contact to adjacet plate surfaces of similar configuration.

10. A vibrator for imparting seismic energy vibrations into a body of water as set forth in claim 8 wherein said control means comprises:
a servovalve having hydraulic fluid inputs and a pair of fluid outputs, said valve being affixed to the underside of said piston plate means within said air chamber;
a first port channeled within said piston plate means and leading from one of said servovalve fluid outputs to within said first bellows; and
a second port channeled within said piston plate means and leading from the other of said servovalve fluid outputs to within said second bellows.

11. A vibrator for imparting seismic energy vibrations into a body of water as set forth in claim 7 wherein said piston plate means comprises:
a plate having an axial center hole through which said shaft means is received;
a cylindrical block bushing affixed to said plate means within said center hole and in contact with said shaft means in sliding, oil-tight relationship;
a pair of collar members affixed on upper and lower surfaces of said plate about said center hole and block bushing, said collar members providing respective upper and lower piston plate connections to said first and second bellows.

References Cited

UNITED STATES PATENTS

| | | | |
|---|---|---|---|
| 2,773,282 | 12/1956 | Dickie | 73—71.6 X |
| 3,159,233 | 12/1964 | Clynch et al. | 181—0.5 |
| 3,225,326 | 12/1965 | Massa | 340—8 |

BENJAMIN A. BORCHELT, *Primary Examiner.*

W. KUJAWA, *Assistant Examiner.*